Figure 1:
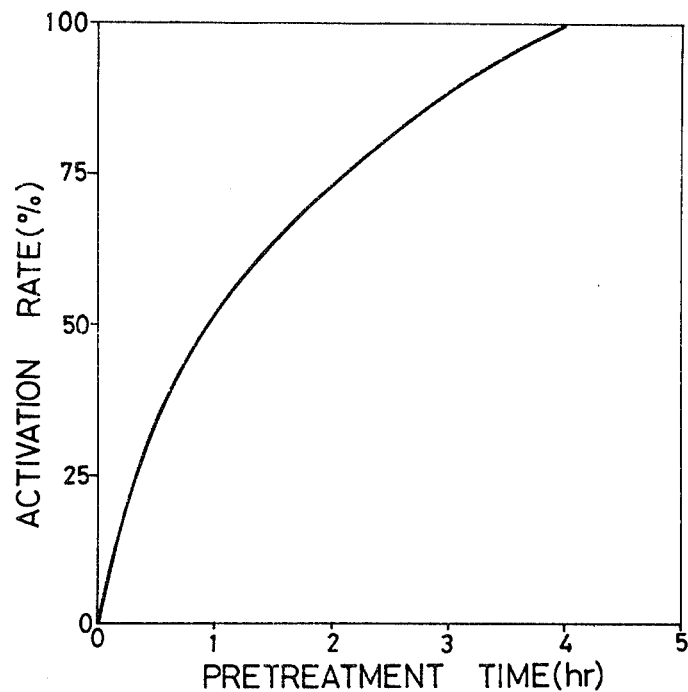

United States Patent [19]

Kawada et al.

[11] 4,199,553
[45] Apr. 22, 1980

[54] GAS PURIFICATION PROCESS

[76] Inventors: Tatsuya Kawada, No. 4613-3, Kaminagaya-cho Kohnan-Ku, Yokohama-shi, Kanagawa-Ken; Hiroshi Uchida, No. 28-70, 3-chome Minamisenju, Tokyo, both of Japan

[21] Appl. No.: 31,208

[22] Filed: Apr. 18, 1979

[51] Int. Cl.$^2$ ............................................. B01D 53/34
[52] U.S. Cl. ..................................... 423/226; 423/236; 423/366; 423/514
[58] Field of Search ............... 423/224, 226, 236, 366, 423/514

[56] References Cited

U.S. PATENT DOCUMENTS

| | | | |
|---|---|---|---|
| 3,459,495 | 8/1969 | Iida et al. | 423/226 |
| 3,937,795 | 2/1976 | Hasebe | 423/226 X |
| 4,002,727 | 1/1977 | Sonoda et al. | 423/226 X |

Primary Examiner—Earl C. Thomas
Attorney, Agent, or Firm—Carroll F. Palmer

[57] ABSTRACT

A process for purifying gases containing hydrogen sulfide and/or hydrogen cyanide is provided wherein said gases are contacted with an absorbing solution containing naphthols or their salts as a catalyst having a nitroso group at α-position or β-position and also acidic group(s) and also having a standard redox potential in the range of 0.4 V or higher but lower than 0.7 V to remove hydrogen sulfide and/or hydrogen cyanide by converting the former mainly into thiosulfuric acid and the latter mainly into thiocyanic acid. According to this process, no trouble caused by sulfur deposit as seen in conventional method occurs, and the scale of purification apparatus is made smaller, and also the amount of catalyst required for purification is reduced. Further, by pretreating the absorbing solution, this process becomes more advantageous.

6 Claims, 2 Drawing Figures

GAS PURIFICATION PROCESS

DESCRIPTION OF THE INVENTION

The present invention relates to a gas purification process by causing an absorbing solution containing specified naphthols or their salts to absorb hydrogen sulfide and/or hydrogen cyanide contained in a gas to remove hydrogen sulfide and/or hydrogen cyanide in the form of thiosulfuric acid and thiocyanic acid converted therefrom, respectively.

Heretofore, with regard to the so-called wet oxidation process wherein a hydrogen sulfide-containing gas is contaced with a catalyst-containing absorbing solution to remove hydrogen sulfide in the form of sulfur converted therefrom as shown in the following equation, various processes have been proposed:

$$H_2S + O \rightarrow S(deposition) + H_2O$$

For example, a process wherein naphthoquinone-sulfonic acid is employed as catalyst (Takahax Process) a process wherein picric acid is employed at catalyst (Fumaks Process), a process wherein anthraquinonedisulfonic acid and metavanadic acid are employed as catalyst(Stretford Process), etc. are mentioned.

However since these processes are directed mainly to converting $H_2S$ into S as seen in the above equation, they have been disadvantageous in that it is necessary for circulating the absorbing solution to remove the resulting sulfur from the solution, resulting in needing a large capacity apparatus such as decanter, filter press, etc., and besides, the resulting sulfur adheres onto packing, etc. in the absorption tower to cause trouble, and further a foaming phenomenon makes the operations difficult.

The present inventors have made various studies for overcoming these drawbacks, and as a result, have found that when an absorbing solution containing certain compounds as a catalyst is employed, it is possible to carry out an extremely effective gas purification wherein absorbed hydrogen gas in converted mostly into thiosulfuric acid, and yet decyanization is almost completely carried out together with desulfurization, and also various troubles brought by sulfur are removed. Certain compounds mentioned above refer to naphthols or their salts, which have a nitroso group at α-position or β-position and also at least one acidic group in their molecule and of which the standard redox potential is in the range of 0.4 or higher but less than 0.7 V. As such compounds, those having the following formulas are mentioned. In addition, the standard redox potential refered to herein means values measured at a temperature of 25° C. and at a pH of 9.0.

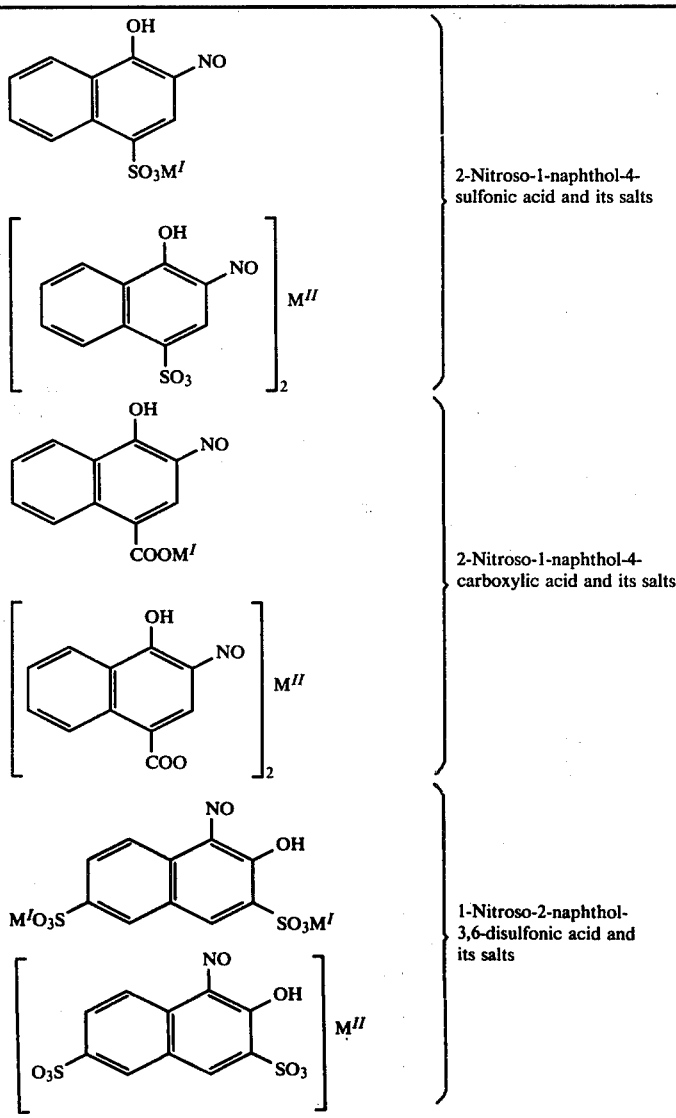

-continued
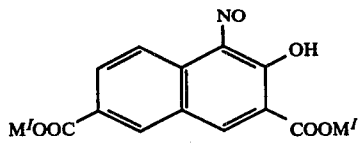
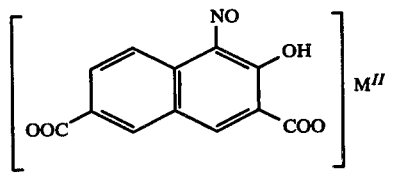
1-Nitroso-2-naphthol-3,6-dicarboxylic acid and its salts
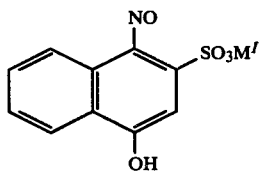
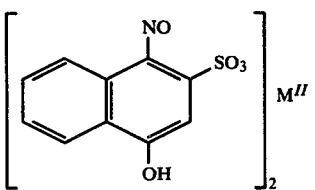
1-Nitroso-4-naphthol-2-sulfonic acid and its salts
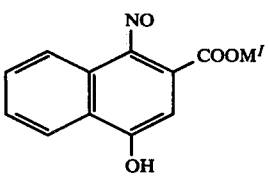
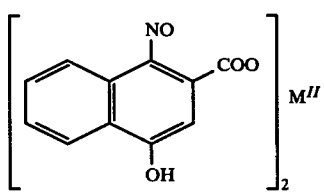
1-Nitroso-4-naphthol-2-carboxylic acid and its salts
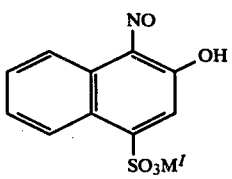
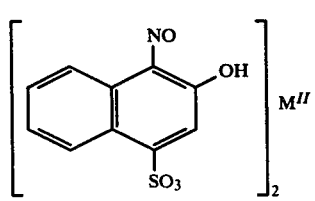
1-Nitroso-2-naphthol-4-sulfonic acid and its salts -continued

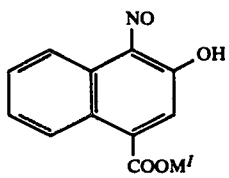
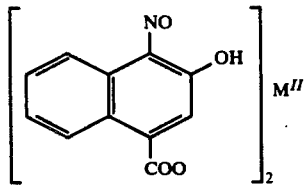

1-Nitroso-2-naphthol-4-carboxylic acid and its salts

In the above-mentioned formulas, $M^I$ represents H, $NH_4$ or an alkali metal and $M^{II}$ means an alkaline earth metal.

These compounds function as a redox catalyst, and oxidizes hydrogen sulfide into thiosulfuric acid and also hydrogen cyanide into thiocyanic acid in the presence of oxygen.

Now, with regard to the oxidation reaction of hydrogen sulfide and the formation reaction of thiosulfuric acid, the standard redox potentials Eo in the reactions will be referred to below.

| | |
|---|---|
| $S + 2H^+ + 2e^- = H_2S(aq)$ | $E_o = 0.142$ V |
| $S_2O_3^- + 6H^+ + 4e^- = 2S + 3H_2O$ | $E_o = 0.465$ V |

On the other hand, the standard redox potentials $E_o$ of oxygen are as follows:

| | |
|---|---|
| $O_2 + 2H^+ + 2e^- = H_2O_2(aq)$ | $E_0 = 0.682$ V |
| $H_2O_2 + 2H^+ + 2e^- = 2H_2O$ | $E_0 = 1.776$ V |

Accordingly, it is conceivable that as the catalyst employed for converting hydrogen sulfide into thiosulfuric acid, a catalyst having a standard redox potential $E_o$ in the range of 0.465–0.682 V is preferable.

Based on this finding, the inventors have made strenuous studies on various compounds useful as a desulfurization-decyanization catalyst, and as a result have found that naphthols or their salts as shown in the following Table 1 are preferable, and have attained the present invention.

Table 1

| No. | Catalyst Compound | Standard redox potential (V) | Oxidation rate (mol/m³ · min) | Percentage formation of thiosulfuric acid (%) |
|---|---|---|---|---|
| 1 | 2-Nitroso-1-naphthol-4-sulfonic acid | 0.48 | 1.5 | 91 |
| 2 | Sodium 2-nitroso-1-naphthol-4-sulfonate | 0.48 | 1.5 | 91 |
| 3 | Calcium 2-nitroso-1-naphthol-4-sulfonate | 0.48 | 1.5 | 90 |
| 4 | Sodium 2-nitroso-1-naphthol-4-carboxylate | 0.47 | 1.5 | 90 |
| 5 | Sodium 1-nitroso-2-naphthol-3,6-disulfonate | 0.53 | 1.7 | 100 |
| 6 | Sodium 1-nitroso-2-naphthol-3,6-dicarboxylate | 0.53 | 1.7 | 99 |
| 7 | Sodium 1-nitroso-2-naphthol-4,5-disulfonate | 0.51 | 1.7 | 97 |
| 8 | Sodium 2-nitroso-1-naphthol-4,5-disulfonate | 0.51 | 1.6 | 98 |
| 9 | Sodium 1-nitroso-4-naphthol-2-sulfonate | 0.53 | 1.6 | 95 |
| 10 | Sodium 1-nitroso-4-naphthol-2-carboxylate | 0.51 | 1.7 | 96 |
| 11 | Sodium 1-nitroso-4-naphthol-4-sulfonate | 0.52 | 1.5 | 98 |
| 12 | Sodium 1-nitro-4-naphthol-4-carboxylate | 0.50 | 1.6 | 95 |
| 13 | Sodium 1-nitroso-4-naphthol-2,6-disulfonate | 0.53 | 1.4 | 93 |
| 14 | Sodium 1-nitroso-4-naphthol-3,7-disulfonate | 0.51 | 1.4 | 96 |

Note 1:
Measurement of standard redox potential was carried out at a pH of 9.
Note 2:
Percentage formation of thiosulfuric acid
$$\frac{\text{Weight of S in thiosulfuric acid formed}}{\text{Weight of S in H}_2\text{S absorbed into absorbing solution}} \times 100(\%)$$
Note 3:
Oxidation rate means reduction rate of HS⁻ per unit time in batch test of absorbing solution, and is expressed by reduction of HS⁻(mol)/absorbing solution (m³)/test time (min.)

Any of the compounds in the above Table have a nitroso group at α-position or β-position and also one or two acidic group such as—$SO^{31}{}_3$, —$COO^-$, etc. in their molecule, and their standard redox potentials are in the range of 0.4 V or higher but less than 0.7 V.

Further, for effectively carrying out desulfurization-decyanization in the presence of catalyst, it is preferable that the oxidation rate of HS⁻ be high, since the high rate thereof results in reduction of the amount of catalyst used, as well as reduction of the amount of absorbing solution used, which makes it possible to reduce the scale of apparatus and affords a very advantageous practical operation.

In this respect, too, since any of the catalyst compounds employed in the present invention have a larger oxidation rate, as shown in Table 1, their catalytic activities are so high that the object can be fully attained.

On the other hand, compounds which are similar to those employed in the present invention but not within the scope of the present invention are enumerated as comparative examples in Table 2.

Table 2

| No. | Catalyst compound | Standard redox potential (V) | Oxidation rate (mol/m$^3$ . min) | Percentage formation of thiosulforic acid (%) |
|---|---|---|---|---|
| 15 | Sodium 2,4-dinitro-1-naphthol-7-sulfonate | 0.32 | 0.4 | 35 |
| 16 | Sodium 1,4-naphthoquinon-2-sulfonate | 0.53 | 1.8 | 57 |
| 17 | Sodium 1,2-naphthoquinone-4-sulphonate | 0.63 | 1.0 | 50 |
| 18 | Sodium 9,4-anthraquinone-2,7-disulfonate | 0.76 | 0.5 | 8 |
| 19 | Picric acid | 0.70 | 0.8 | 54 |
| 20 | Tiron | 0.66 | 0.7 | 7 |
| 21 | p-Quinone dioxime | 0.34 | 0.7 | 36 |

Compounds of No. 18 and No. 19 having an $E_o$ of 0.7 V or higher and No. 15 having an $E_o$ of lower than 0.4 V are much lower in oxidation rate than the compounds shown in Table 1, and other compounds are generally lower in the percentage formation of thiosulfuric acid, although the compound of No. 16 is exceptionally high in oxidation rate alone, and as a result, it is impossible for the compounds in Table 2 to attain the desired effectivenesses. Thus, the catalyst compounds which sufficiently satisfy two requirements of the percentage formation of thiosulfuric acid and the oxidation rate are limited to those employed in the present invention.

Further, it is an indispensable requirement for the catalyst compounds employed in the present invention to introduce at least one acidic group such as —$SO^-_3$, —$COO^-$, etc. into the molecule, which is very effective for enhancing the solubility of the catalyst in the absorbing solution wherein the catalyst of the present invention is employed, and also for lowering the redox potential down to an optimal potential to thereby increase the percentage formation of thiosulfuric acid. It does not matter if chlating agent, reaction-promoter, surfactant or other modifier or additive is added to the absorbing solution in an amount in the range where the reaction is not hindered. Further it is also possible to employ two or more kinds of the catalyst compounds.

In the present invention, it is a further specific feature to activate the catalyst compound and employ the absorbing solution containing this activated catalyst compound in the reaction. Namely, the absorbing solution containing the catalyst compound, of the present invention, of course, exhibits its activity at the initial period at which specified naphthols or their salts have been dissolved, but usually no sufficient activity is exhibited unless the solution is used over 20 hours or longer.

The inventors have made various studies for imparting a sufficient activity to the absorbing solution so that the activity may be exhibited from the beginning of its used, and as a result have found that if an aqueous solution of the catalyst compound is subjected to an adequate pretreatment by blowing air into the aqueous solution, in advance of dissolving the aqueous solution in an alkaline absorbing solution, then the catalyst is immediately activated at the time of its use.

FIG. 1 of the accompanying drawings shows a graph illustrating this activation of the catalyst compound of the present invention.

Figure 2:
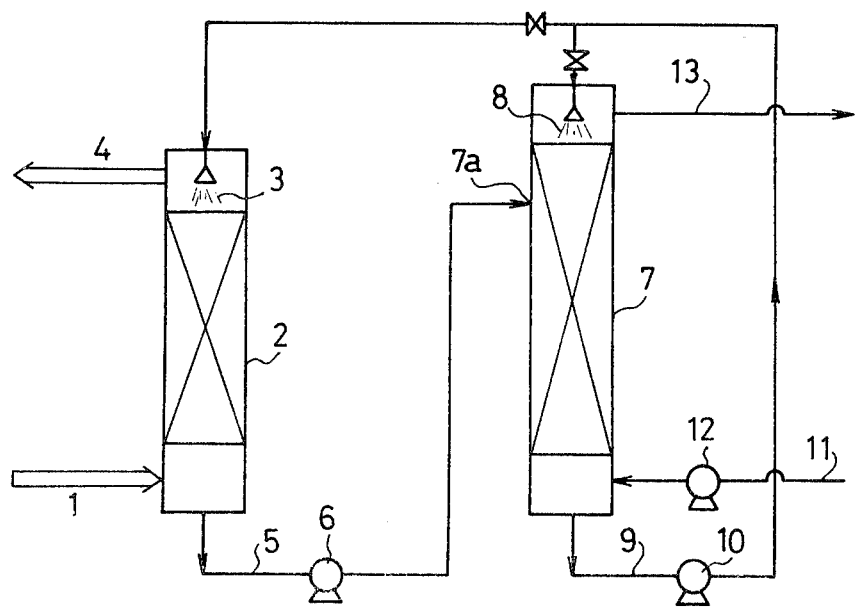

FIG. 2 shows a diagram illustrating a preferable production apparatus by means of which the process of the present invention is carried out.

In FIG. 1, the abscissa shows a pretreatment time (hr.) for catalyst and the ordinate shows a activation rate of catalyst through the pretreatment thereof (%).

A pretreatment was carried out by blowing air at a rate of 15 l hr into 2 l of an aqueous solution containing 2-nitroso-1-napthhol-4-sulfonic acid as an example of the catalyst compound, in an amount of 70 mols/m$^3$, maintained at a temperature of 30° C. An adequate amount of the resulting aqueous solution of the catalyst compound was added to an ammonia aqueous solution maintained at a pH of 0.2, so as to give a concentration of 2 mols/m$^3$. Further, NH$_4$HS was added so as to give a concentration of 65 mols/m$^3$. Thereafter, air was blown into the resulting solution with stirring, and the liquid phase oxidation rate of NH$_4$HS in the presence of 2-nitroso-1-naphthol-4-sulfonic acid was measured to obtain the activation rate (%). As a result it was observed that the solution subjected to the pretreatment for 4 hours was completely activated. Such a pretreatment yeilds advantages that it is possible to fully make use of the performance of the catalyst and it is also possible to obtain a higher percentage desulfurization-decyanization with a smaller amount of the catalyst.

As for another specific feature of the present invention, there is mentioned a method wherein the absorbing solution is regenerated by containing it with air or oxygen in a gas-liquid contact manner, in a counter flow tower. In this case, since the catalyst employed in the present invention catalyzes the oxidation of hydrogen sulfide into thiosulfuric acid, there occurs no trouble brought by adherence of sulfur onto packing material, etc. Thus, it is possible to employ a counter flow tower having a packing material packed therein, as an apparatus for regenerating the absorbing solution, whereby the gas-liquid contact efficiency is further enhanced and also the scale of the apparatus is made smaller. Thus, this regenerating process is a very excellent one.

This process, however, has a drawback that hydrogen sulfide and/or hydrogen cyanide in the solution are driven off due to the stripping effect of air or oxygen for oxidation and contained in the exhaust gas from the top of the counter flow tower, which is very undesirable from the viewpoint of environmental conservation.

Thus the inventors have made various studies or overcoming this drawback, and as a result have found that if a process is employed wherein the absorbing solution is introduced into a middle stage of the counter flow tower, air or ocygen is introduced into the tower at its bottom, and the absorbing solution withdrawn from the bottom of the tower is partly circulated to the top of the tower, then it is possible to reduce the content of hydrogen sulfide and/or hydrogen cyanide in the exhaust gas from the counter flow tower, down to substantially zero. Namely, according to the above-mentioned process, the upper part of the counter flow tower functions as a zone for absorbing hydrogen sulfide and/or hydrogen cyanide, and it is possible to reduce the concentration of hydrogen sulfide and/or hydrogen cyanide in the exhaust gas.

The above-mentioned gas purification process of the present invention will be illustrated referring to FIG. 2.

In FIG. 2, an unpurified gas 1 is introduced into the absorption tower 2 at its bottom part, ascends through the tower 2 and is contacted with an absorbing solution falling from the top of the tower. The absorbing solution absorbs hydrogen sulfide and/or hydrogen cyanide and the resulting purified gas 4 is discharged outside the tower.

The absorbing solution having hydrogen sulfide and/or hydrogen cyanide absorbed therein and accumulated at the bottom of the tower is sent through a conduit 5 to a middle stage 7a of a counter flow tower 7 for regenerating the absorbing solution, having a packing material such as Raschig ring packed therein, by means of a pump 6, while air is blown through a conduit 11 into the tower 7 at its bottom by means of a blower 12 and contacted with the absorbing solution in a counter flow manner to regenerate the absorbing solution.

A part 8 of the resulting regenerated absorbing solution is circulated through a conduit 9 to the top of the tower by means of a pump 10, flows down and completely removes hydrogen sulfide and/or hydrogen cyanide contained in the ascending air, while the resulting air is discharged through a conduit 13 to the outside. The most part of the resulting regenerated absorbing solution is sent to the absorption tower 2.

The process of the present invention will be described below in more detail by way of Examples.

EXAMPLE 1

An absorption tower is constructed by providing a glass tube having an inner diameter of 70 mm and a height of 1000 mm and packing therein Raschig rings having a diameter of 10 mm up to a height of 800 mm, and separately a glass tube having an inner diameter of 100 mm and a length of 1800 mm is employed as a regeneration tower for an absorbing solution.

An absorbing solution (at 30° C.) consisting of an alkaline aqueous solution having 2-nitroso-1-naphthol-4sulfonic acid dissolved therein in a proportion of 5 mols/m$^3$, was flow down from the top of the absorption tower at a rate of 50 l/hr, while a nitorgen gas containing 0.8% by volume of hydrogen sulfide and 0.65% by volume of ammonia was instroduced into the tower at its bottom at a rate of 1 Nm$^3$/hr and contacted with the solution.

The resulting absorbing solution having absorbed a part of ammonia contained in the nitrogen gas and almost all of hydrogen sulfide also contained therein was sent to the regeneration tower at its bottom part at a rate of 50 l/hour, while air was blown into the tower at its bottom part at a rate of 60 l/hour to effect gas-liquid contact.

As a result, the most part of hydrogen sulfide in the absorbing solution was oxidized into thiosulfuric acid, and the resulting absorbing solution was regenerated and again sent to the top part of the absorption tower. During the operation, no foaming phenomenon caused by formation of sulfur was observed at the top part of the regeneration tower, and also sulfur particle was hardly observed. The results are shown in Table 3.

Table 3

| After start of operation | Concentration of H$_2$S in gas (ppm) | | Percentage desulfurization (%) | Percentage Formation of thiosulfuric acid (%) |
|---|---|---|---|---|
| | at inlet of absorption tower | at exit of absorption tower | | |
| 6 hours | 8000 | 800 | 90.0 | 50 |
| 13 hours | 8000 | 350 | 95.6 | 70 |
| 20 hours | 8000 | 7 | 99.9 | 90 |
| 27 hours | 8000 | 5 | 99.9 | 91 |

EXAMPLE 2

Two liters of an aqueous solution containing 2-nitroso-1-naphthol-4-sulfonic acid in a proportion of 70 mols/m$^3$ was pretreated by blowing air into the solution at a rate of 15 l/hour for 2 hours, and thereafter an adequate amount of this solution was dissolved in 20 l of an alkaline solution (at a solution temperture of 30° C.) so as to give a concentration of 5 mols/m$^3$. Test was carried out under the same conditions and employing the same gas as in case of Example 1 except for the above-mentioned pretreatment. The results are shown in Table 4.

Table 4

| After start of operation | Concentration of H$_2$S in gas (ppm) | | Percentage desulfurization (%) | Percentage of formation thiosulfuric acid (%) |
|---|---|---|---|---|
| | at inlet of absorption tower | at exit of absorption tower | | |
| 6 hours | 8000 | 8 | 99.9 | 90 |
| 13 hours | 8000 | 8 | 99.9 | 90 |
| 20 hours | 8000 | 7 | 99.9 | 90 |
| 27 hours | 8000 | 5 | 99.9 | 91 |

EXAMPLE 3

A test was carried out under the same conditions as in Example 1 except that the composition of gas to be purified was varied.

A gas to be purified contained 0.8% by volume of hydrogen sulfide, 0.1% by volume of hydrogen cyanide and 0.65% by volume of ammonia. After 27 hours since start of the operation, the percentage desulfurization, the percentage decyanization and the percentage formation of thiosulfuric acid were 99.9%, 99.0% (all of product was thiocyanic acid) and 91%, respectively.

EXAMPLE 4

A test was carried out under the same conditions and employing the same gas as in Example 1, except that sodium 1-nitroso-2-naphthol-3,6-dicarboxylate was substituted as catalyst. The results are shown in Table 5.

Table 5

| After start of operation | Concentration of H$_2$S in gas (ppm) | | Percentage desulfurization(%) | Percentage of formation thiosulfuric acid (%) |
|---|---|---|---|---|
| | at inlet of absorption tower | at exit of absorption tower | | |
| 13 hours | 8000 | 820 | 89.9 | 100 |
| 20 hours | 8000 | 89 | 98.9 | 100 |
| 27 hours | 8000 | 80 | 99.0 | 100 |

EXAMPLE 5

A single type desulfurization tower which is able to absorb and regenerate simultaneously, was constructed by providing a glass tube having an inner diameter of 70 mm and a height of 1000 mm and packing therein Raschig rings having a diameter of 10 mm up to a height of 800 mm. Twenty liters of an alkaline aqueous solution (pH: 9) having sodium 1-nitroso-4-naphthol-2-sulfonate dissolved therein in a proportion of 5 mols/m$^3$, was flown down from the top part of said single type desulfurization tower at a rate of 50 l/hr., while N$_2$ gas containing 0.65% by volume of ammonia and 0.8% by volume of hydrogen sulfide was blown into the tower at its bottom part at a rate of 60 l/hr. and at the same time air was blown thereinto at a rate of 1 m$^3$/hr. to subject them to gas-liquid contact whereby desulfurization together with regeneration were carried out. The results are shown in Table 6.

Table 6

| After start of operation | Concentration of H$_2$S in gas (ppm) | | Percentage desulfurization (%) | Percentage of formation thiosulfuric acid (%) |
|---|---|---|---|---|
| | at inlet of absorption tower | at exit of absorption tower | | |
| 13 hours | 8000 | 500 | 93.8 | 95.2 |
| 20 hours | 8000 | 135 | 98.3 | 97.0 |
| 27 hours | 8000 | 92 | 98.9 | 98.3 |

At the initial period of the operation, a foaming phenomenon was observed to a certain extent, but it was scarcely observed after 20 hours.

EXAMPLE 6

A test was carried out under the same conditions and employing the same apparatus as in Example 1 except that an alkaline aqueous solution containing sodium 2-nitroso-1-naphthol-4-carboxylate as catalyst in a proportion of 5 mols/m$^3$ was substituted. The results were as follows: After 20 hours, the percentage desulfurization was 99%, and the percentage formation of thiosulfuric acid was 90%.

COMPARATIVE EXAMPLE

A test was carried out under the same conditions and employing the same apparatus as in Example 1 except that an aqueous solution having ammonium 1,4-naphthoquinone-2-sulfonate as catalyst in place of 2-nitroso-1-naphthol-4-sulfonic acid, dissolved therein, in a proportion of 5 mols/m$^3$, was employed. Regeneration was carried out under the same conditions and employing the same apparatus as in Example 1. The results are shown in Table 7.

Table 7

| After start of operation | Concentration of H$_2$S in gas (ppm) | | Percentage desulfurization (%) | Percentage of formation thiosulfuric acid (%) |
|---|---|---|---|---|
| | at inlet of absorption tower | at exit of absorption tower | | |
| 13 hours | 8000 | 6 | 99.9 | 63 |
| 20 hours | 8000 | 30 | 99.6 | 65 |
| 27 hours | 8000 | 90 | 98.6 | 65 |

In this comparative example, although the percentage desulfurization was high, formation of sulfur was considerably notable. Namely, a few hours after start of the operation, formation of sulfur particles occured and they adhered onto the packing material. Particularly at the top part of the regeneration tower, a violent foaming phenomenon was observed.

EXAMPLE 7

An absorption tower was constructed by providing a tower having an inner diameter of 900 mm and a height of 9 m and packing therein a packing material of Tellerette L type up to a height of 5 m, and separately a counter flow tower was constructed by providing a tower having an inner diameter of 750 mm and a height of 12 m and packing therein a packing material of Tellerette L type in two stages, the height of the upper stage being 2.2 m and that of the lower being 4.6 m.

Two hundred liters of an aqueous solution containing 2-nitroso-1-naphthol-4-sulfonic acid in a proportion of 70 mols/m$^3$ was pretreated by blowing air therein for 4 hours at a rate of 500 l/hr., and thereafter an adequate amount of the resulting solution was dissolved in 5 m$^3$ of an ammonia aqueous solution so as to give a concentration of 2 mols/m$^3$. The resulting solution was flown down from the top of the absorption tower at a rate of 22m$^3$/hr., while a coke oven gas containing 0.3% by volume of hydrogen sulfide, 0.12% by volume of hydrogen cyanide and 1.0% by volume of ammonia was introduced into the bottom of the absorption tower at a rate of 1000 Nm$^3$/hr. to bring them into contact.

The resulting absorbing solution withdrawn from the bottom of the absorption tower was fed between the upper stage and the lower stage of the packed parts of the counter flow tower at a rate of 22 m$^3$/hr. and flown down, while air was blown into the bottom of the counter flow tower at a rate of 60 Nm$^3$/hr. to effect gas-liquid contact. The results are shown in Table 8.

Table 8

| After start of operation | 6 Hours | 13 Hours | 20 Hours | 27 Hours |
|---|---|---|---|---|
| Percentage desulfurization (%) | 99.9 | 99.9 | 99.9 | 99.9 |
| Percentage decyanization (%) | 99.0 | 99.0 | 99.0 | 99.0 |
| Percentage formation of thiosulfuric acid (%) | 90 | 91 | 91 | 91 |
| H$_2$S concentration in exhaust gas from counter flow tower (ppm) | 180 | 180 | 180 | 180 |

EXAMPLE 8

A test was carried out under the same conditions and employing the same gas as in Example 7 except that a part of the solution withdrawn from the bottom of the counter flow tower was sent to the top of the counter flow tower at a rate of 4 m$^3$/hr. and flown down, while the absorbing solution withdrawn from the bottom of the absorption tower was sent between the upper stage and the lower stage of the packed parts of the counter flow tower at a rate of 22 m$^3$/hr. and flown down. The results are shown in Table 9.

Table 9

| After start of operation | 6 Hours | 13 Hours | 20 Hours | 27 Hours |
|---|---|---|---|---|
| Percentage desulfurization | 99.9 | 99.9 | 99.9 | 99.9 |

Table 9-continued

| After start of operation (%) | 6 Hours | 13 Hours | 20 Hours | 27 Hours |
|---|---|---|---|---|
| Percentage decyanization (%) | 99.0 | 99.0 | 99.0 | 99.0 |
| Percentage formation of thiosulfuric acid (%) | 90 | 91 | 91 | 91 |
| H₂S concentration in exhaust gas from counter flow tower (ppm) | 5 | 5 | 4 | 2 |

What is claimed is:

1. A process for purifying a gas containing hydrogen sulfide and/or hydrogen cyanide which comprises
    contacting a gas containing hydrogen sulfide and/or hydrogen cyanide with an absorbing solution containing at least one of naphthols or their salt(s) having a nitroso group at α-position or β-position and also at least one acidic group in the molecule thereof and also having a standard redox potential in the range of 0.4 V or higher but lower than 0.7 V, to cause said absorbing solution to absorb the hydrogen sulfide and/or the hydrogen cyanide contained in said gas, and thereafter
    contacting air or oxygen with the resulting absorbing solution in a gas-liquid contact manner, to thereby convert hydrogen sulfide mainly into thiosulfuric acid and hydrogen cyanide mainly into thiocyanic acid to remove hydrogen sulfide and/or hydrogen cyanide, and at the same time regenerate the resulting absorbing solution.

2. A process for purifying a gas containing hydrogen sulfide and/or hydrogen cyanide according to claim 1, wherein said at least one of naphthols or their salt(s) is selected from the group consisting of 2-nitroso-1-naphthol-4-sulfonic acid, 2-nitroso-1-naphthol-4-carboxylic acid, 1-nitroso-2-naphthol-3,6-disulfonic acid, 1-nitroso-2-naphthol-3,6-dicarboxylic acid, 1-nitroso-4-naphthol-2-sulfonic acid, 1-nitroso-4-napththol-2-carboxylic acid, 1-nitroso-2-naphthol-4-sulfonic acid, 1-nitroso-2-naphthol-4carboxylic acid and their salts.

3. A process for purifying a gas containing hydrogen sulfide and/or hydrogen cyanide according to claim 1, wherein said absorbing solution is alkaline.

4. A process for purifying a gas containing hydrogen sulfide and/or hydrogen cyanide according to claim 1, wherein said absorbing solution is the one obtained by pretreating an aqueous solution containing said at least one of naphthols or their salts(s) by blowing air into said aqueous solution.

5. A process for purifying a gas containing hydrogen sulfide and/or hydrogen cyanide according to claim 1, wherein said gas-liquid contact of said absorbing solution having absorbed hydrogen sulfide and/or hydrogen cyanide with air or oxygen consists of a gas-liquid contact of said absorbing solution introduced into a counter flow tower at its middle stage, with air or oxygen introduced into said tower at its bottom and a gas-liquid contact of a part of said absorbing solution circulated from the bottom to the top of the tower, with air or oxygen ascending inside the tower.

6. A process for purifying a gas containing hydrogen sulfide and/or hydrogen cyanide according to claim 5, wherein said counter flow tower contains a packing material.

* * * * *